(12) United States Patent
MacDonald

(10) Patent No.: US 6,255,753 B1
(45) Date of Patent: Jul. 3, 2001

(54) ELECTROMAGNETIC ROTATING MACHINE

(76) Inventor: William Barry MacDonald, 21 A Harris St., Palmyra WA 6157 (AU)

( * ) Notice: Subject to any disclaimer, the term of this patent is extended or adjusted under 35 U.S.C. 154(b) by 0 days.

(21) Appl. No.: 09/438,671

(22) Filed: Nov. 12, 1999

(51) Int. Cl.[7] .................................................. H02K 1/00
(52) U.S. Cl. ........................ 310/179; 310/180; 310/186; 310/190; 310/216; 310/268
(58) Field of Search ................................ 310/179, 180, 310/185, 186, 216, 224, 258, 268, 233, 190

(56) References Cited

U.S. PATENT DOCUMENTS

| | | | |
|---|---|---|---|
| Re. 33,628 | * 7/1991 | Hahn | 310/268 |
| 4,629,948 | * 12/1986 | Tassinario | 318/254 |
| 5,179,307 | * 1/1993 | Porter | 310/68 B |
| 5,334,899 | * 8/1994 | Skybyk | 310/268 |
| 5,786,645 | * 7/1998 | Obidniak | 310/68 R |

* cited by examiner

*Primary Examiner*—Nestor Ramirez
*Assistant Examiner*—Thanh Lam
(74) *Attorney, Agent, or Firm*—David W. Carstens; Carstens, Yee & Cahoon, L.L.P.

(57) ABSTRACT

An electro magnetic rotating machine comprising at least a rotor having at least one magnet creating rotor magnetic poles; and at least one pair of axially spaced apart solenoids disposed on opposite sides of the rotor magnetic poles, the axis of each solenoid is arranged to be transverse a radius of the path of rotation of the rotor. The solenoids are configured to minimize overlapping of magnetic flux between at least one of the rotor magnetic poles and one of the solenoids when said magnetic pole is adjacent to said solenoid.

16 Claims, 4 Drawing Sheets

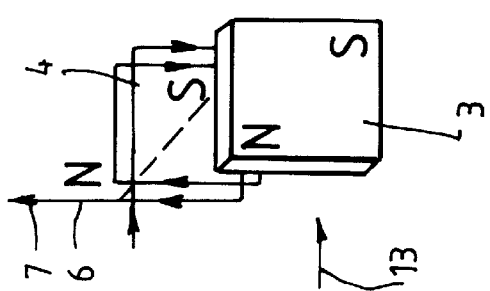
FIG. 4a.
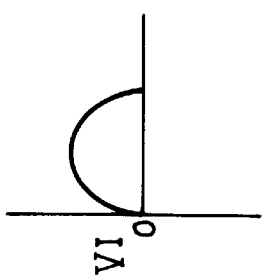
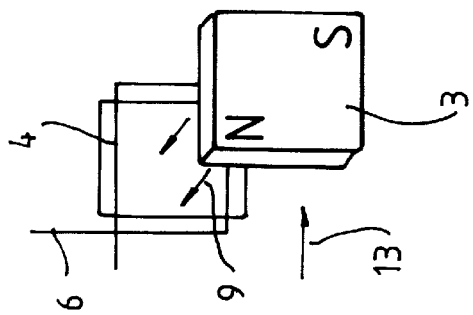
FIG. 4b.
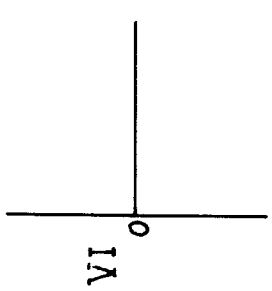
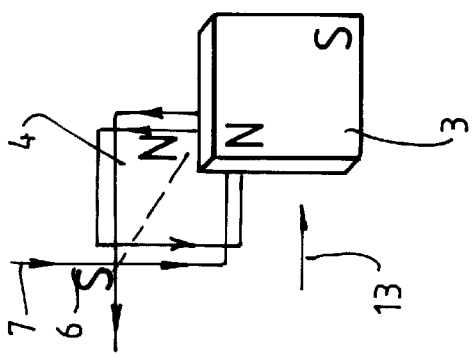
FIG. 4c.
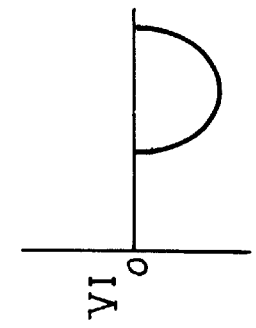
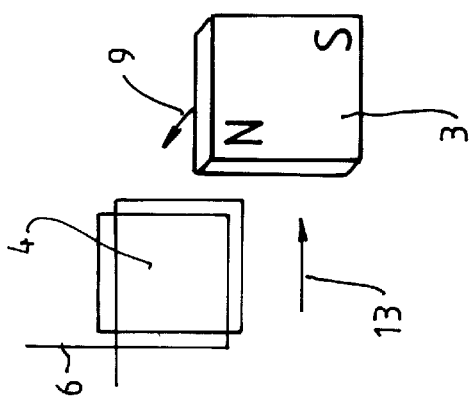
FIG. 4d.
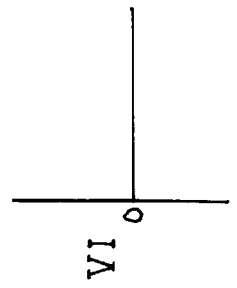

ELECTROMAGNETIC ROTATING MACHINE

The present invention relates to electro magnetic machines. In particular the present invention relates to axial flux electro magnetic machines.

In Australian patent number 668251 an electro magnetic machine is disclosed including the use of at least one pair of axially spaced apart electro magnetic stator coils on opposite sides of a rotor, the axis of each electro magnetic stator coil being spaced from and substantially transverse to the axis of the rotor and said rotor arranged to pass between said electro magnetic stator coils, said electromagnetic stator coils being connected, in series, to axially spaced part fixed solenoids disposed on opposite sides of said rotor magnetic poles, the axis of each said fixed solenoid being substantially transverse to a radius of said rotor. A composite magnetic field force is created around said electro magnetic stator coils, said fixed solenoids and rotor magnetic poles, such that said composite magnetic field is biased to the point of rotation of said rotor.

However, this specification does not contemplate the problem arising from overlapping magnetic field between each solenoid and rotor magnetic pole. The overlapping of magnetic field along the plane of rotation of the rotor produces resistance to rotation of the rotor and thus decreased efficiency of the machine. This problem is discussed in more detail below.

The present invention seeks to overcome the above mentioned problem.

In accordance with one aspect of the present invention there is provided an electro magnetic rotating machine comprising at least:
  a rotor having at least one magnet creating rotor magnetic poles; and
  at least one pair of axially spaced part solenoids disposed on opposite sides of the rotor magnetic poles, the axis of each solenoid is arranged to be transverse a radius of the path of rotation of the rotor, wherein the solenoids are configured to minimise overlapping of magnetic flux between at least one of the rotor magnetic poles and one of the solenoids when said magnetic pole is adjacent to said solenoid.

Preferably, each of the solenoids has substantially the same peripheral shape in cross-section as the magnets, whereby the magnetic flux created by the solenoid and rotor magnetic pole has minimal overlap when they are aligned.

Preferably, when the electro magnetic rotating machine operates as a motor, the solenoids are excited by an external power source, thereby creating a magnetic field that causes the rotor magnetic poles to rotate.

More preferably, the electro magnetic rotating machine includes bias means for providing a directionally biased magnetic field for biasing the rotor to rotate in a predetermined direction.

Still more preferably, the bias means is in the form of at least one pair of axially spaced apart induction coils disposed on opposite sides of the rotor magnetic poles, the axis of each induction coil is arranged to be transverse the axis of rotation of the rotor.

Preferably, when the electro magnetic rotating machine operates as a generator the rotor is rotated by an external means, thereby creating a dynamic magnetic field that generates electric current in the solenoids.

More preferably, the dynamic magnetic field generates additional electric current in at least one pair of axially spaced apart induction coils disposed on opposite sides of the rotor magnetic poles, the axis of each induction coil is arranged to be transverse the axis of rotation of the rotor.

Preferably, the electric current generated is an alternating current.

Preferably, the electro magnetic rotating machine operates as a motor and a generator, wherein a first set of solenoids are excited by an electricity generating means, thereby creating a magnetic field that causes the rotor to rotate, and the rotation of the rotor creates a rotating magnetic field that generates an electric current in a second set of solenoids as the rotating magnetic field passes each solenoid of the second set.

Preferably, the electro magnetic rotating machines includes a commutator axially coupled to the rotor, and the commutator is arranged to provide periodic completion of an electric circuit that provides, a pulse of direct electric current to the first set of solenoids during completion of the circuit.

Preferably, each solenoid is serially connected to a corresponding inductance coil.

Preferably, each serially connected solenoid and inductance coil are arranged to be adjacent each other so as to create a composite magnetic field.

Preferably, said solenoids are provided with a substantial number of conductor windings around a thin walled copper core.

In order to provide a better understanding of the present invention, a preferred embodiment will now be described with reference to the accompanying drawings, in which:

FIGS. 4A, 4B, 4C & 4D show a schematic depiction of current flows and lines of magnetic flux produced by a preferred embodiment of a machine in accordance with the present invention;

Figure 1:
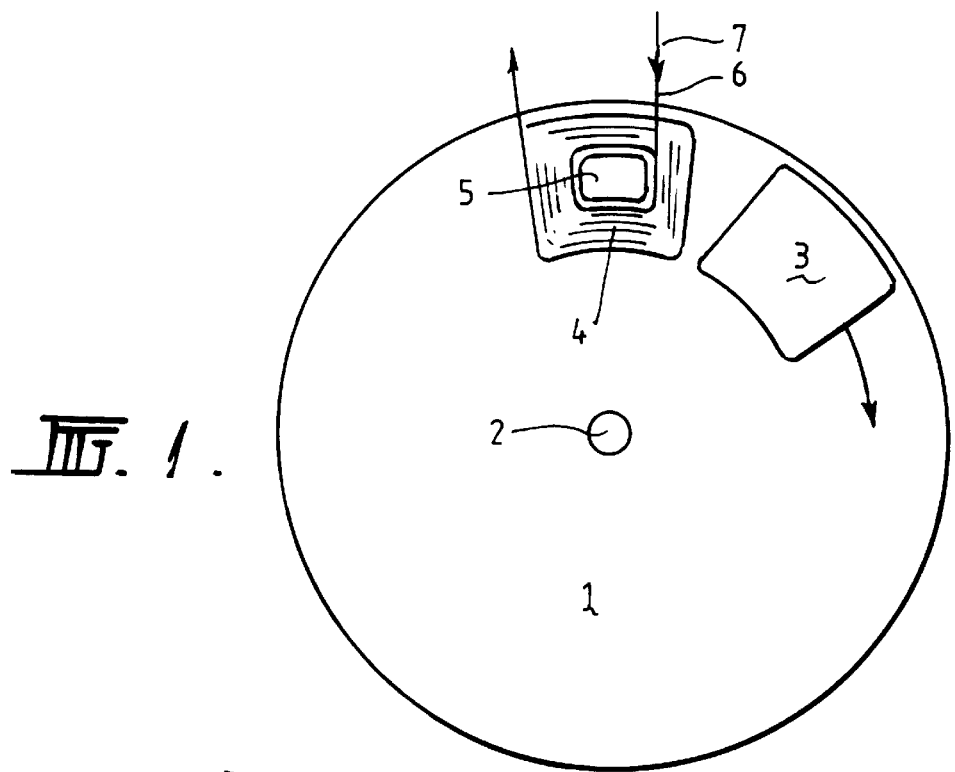
FIG. 1 shows a schematic side view of a rotor, a solenoid and a rotor magnetic pole.

Referring to FIG. 1, there is provided an electro magnetic rotation machine including a rotor 1 having a drive shaft 2 and at least one permanent or electro magnet 3. On either side of the rotor 1 are spaced apart solenoids 4 and 8. Each solenoid is formed by numerous windings of an insulated conductor around a copper former 5. The solenoid 4 is shown having been energised by an electric current with current flow designated by arrow 7.

Figure 2:
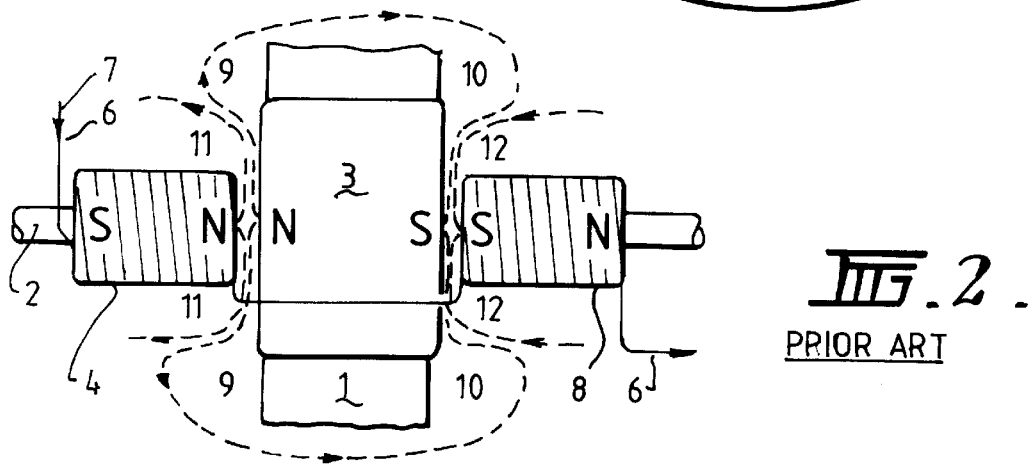
FIG. 2 shows a schematic top view of the rotor and a pair of solenoids of the prior art with a miss-matched system of solenoids and rotor magnetic poles.

Referring to FIG. 2, the problem of the prior art is shown. The solenoids 4 and 8 are miss-matched with rotor magnet 3. In particular the solenoids are smaller in cross-section that the magnet. It can be seen that magnetic field 9 and 10 produced by the magnetic poles N and S of the magnet 3 bulges around the magnetic field 11 and 12 produces by solenoids 4 and 8. Since the field from the rotor magnetic poles and the solenoids are both in the same direction at the overlap conjunction, repulsion between the fields occur and the rotor magnetic poles are held static, or at least resistance to rotational movement of the rotor is provided.

Figure 3:
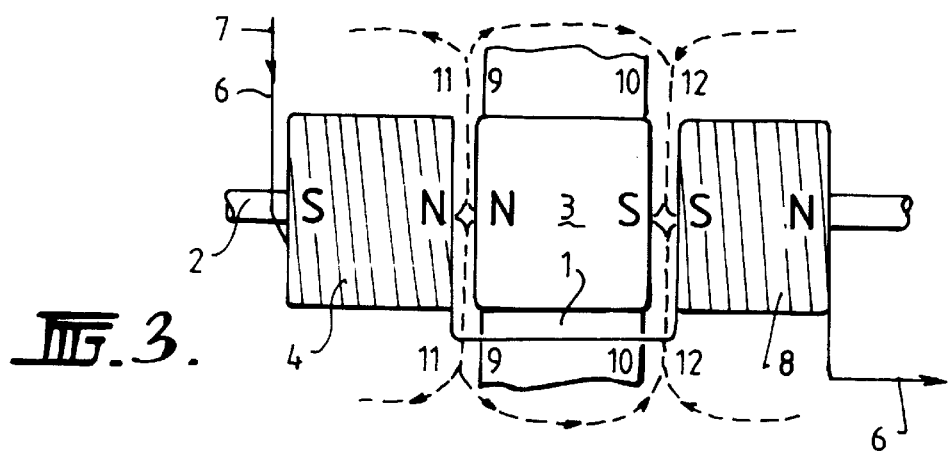
FIG. 3 shows a schematic top view of the rotor means and a pair of solenoids of a preferred embodiment of the present invention.

Referring to FIG. 3, a preferred form of the present invention is shown. In this case the field produced by the axially spaced apart solenoids 4 and 8 matches the field produced by the rotor magnetic poles N and S of the magnet 3. Preferably, the axis of the solenoids 4 are parallel with the axis of rotation of the rotor. The solenoids 4 and 8 have a peripheral dimension and shape that corresponds in cross-section to the magnet 3. The longitudinal length of the solenoid is preferably similar to the longitudinal length of the magnet, although not essentially so. It can be seen that lines of magnetic flux 9 and 10 produced by rotor magnetic poles N and S of the magnet 3 do not overlap the lines or magnetic flux 11 and 12 produced the solenoids 4 and 8 along the plane of rotation of the rotor. The magnetic field repels equally in all directions. This allows the rotor to be free to move, or at least minimises overlapping of magnetic flux on either side of the rotor magnetic poles, thus minimising resistance to rotation of the rotor.

The rotor shown in FIG. 3 is able to move in either direction, preferably there is also provided an initial directional impetus means which urges the rotor to rotate in a particular direction at startup.

In FIGS. 4A to 4D, the machine is acting as a generator, the rotor is activated by an external means causing the rotor magnetic pole N to pass the solenoid 4 in a direction indicated by arrow 13. Referring to FIG. 4A, the moving magnet 3, is not yet in line with the solenoid 4. As the pole N approaches the solenoid 4 the magnetic flux density increases with respect to the solenoid. The increase in the magnetic flux density causes a current to flow in the first (left) vertical half of the conductor of windings of the solenoid. The current is indicated by the arrow 7. As the magnetic pole N continues, the current flow will peak and then reduce to a point where it is negligible when the magnet 3 and solenoid are aligned as shown in FIG. 4B. The reduction is due to a matching effect, where the second (right) vertical half of the conductor windings of the solenoid are energised by the magnetic field, only reversed in polarity. The summing of the current of both vertical halves produces a decreasing current flow, at this stage, due to the amplitudes eventually become equal.

Referring to FIG. 4B, the magnetic field 9 is applied equally to both vertical halves of the conductor windings of solenoid 4. The current in both halves is equal and opposed and thus no current flows.

As the magnet 3 continues to pass the solenoid 4 the magnetic field is applied to the second vertical half of the conductor windings of the solenoid to a greater extent than the first vertical half, so current flows in the opposite direction until it reaches a peak and then falls off as indicated in FIG. 4C. In FIG. 4D the magnetic field 9 has passed sufficiently beyond the solenoid 4 to induce negligible current flow.

It can therefore be seen that as the rotor magnetic pole N of the magnet 3 passes across the face of the solenoid a full cycle of alternating current is produced.

Figure 5:
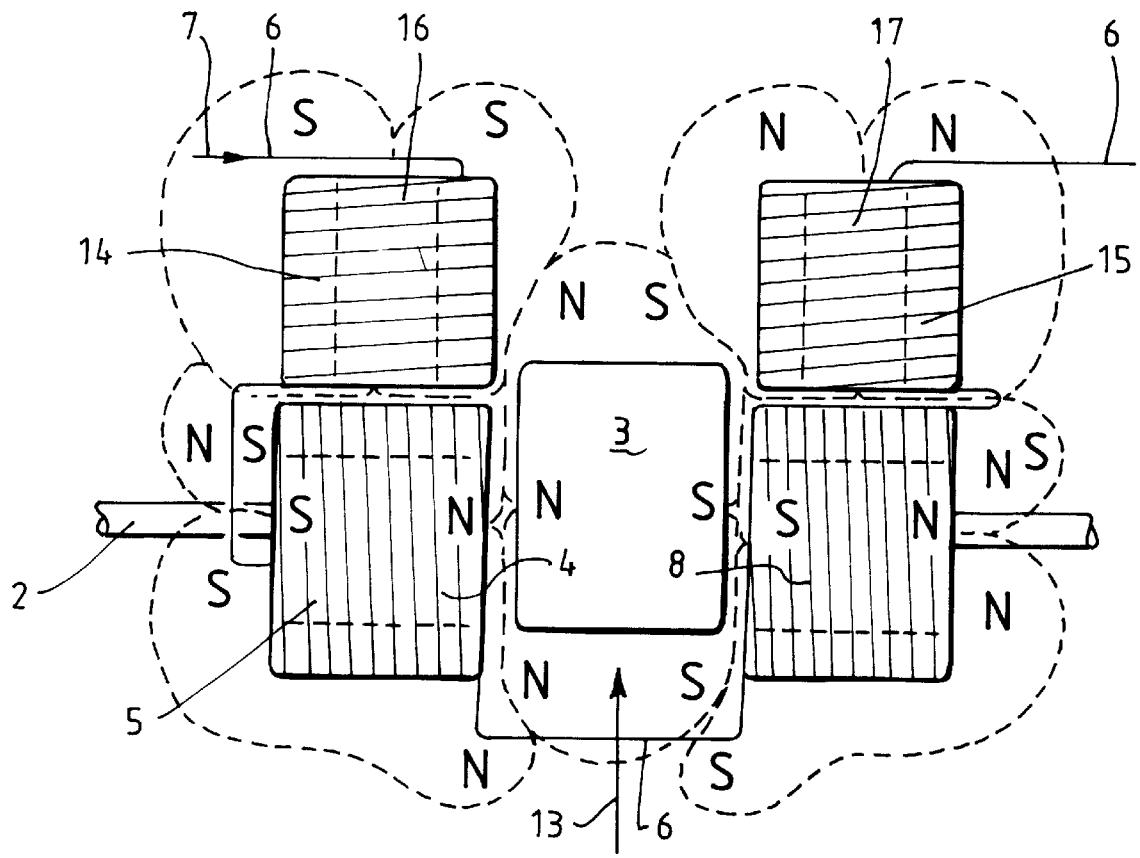
FIG. 5 shows a schematic top view of the rotor and associated solenoids with induction coils producing a composite magnetic field.

Referring to FIG. 5, adjacent the pair of solenoids 4 and 8 is a pair of inductive stator coils 14 and 15 which are formed of insulated conductors wound around copper formers 16 and 17. The axis of the stator coils are transverse to the axis of the rotor. Preferably, they are parallel with the plane of rotation of the rotor. The stator coils 14 and 15 are shown as square stator coils.

The stator coil 14 is serially connected to the solenoid coil 4. The solenoid coil 8 is also serially connected to the stator coil 15. Preferably, the solenoids 4 and 8 are also serially connected by conductor 6. The stator coils 14 and 15 introduce a directional magnetic force to the rotor magnetic poles N and S that urges the rotor to move in a direction indicated by the arrow 13. It can be seen that when an externally applied current flow through wiring 6, in the direction shown by arrow 7, a magnetic field is created in the stator coils 14 and 15 and the solenoids 4 and 8.

The end of each stator coil closest to the adjacent solenoids creates a magnetic pole N of the same priority as the magnetic pole N created by the end of the solenoid adjacent the rotor magnetic pole N. Thus at the end of the stator coil furthermost from the solenoid a magnetic poles of opposite polarity to the magnetic poles of the solenoid and the magnet 3, which causes a magnetic attraction of the moveable rotor magnetic pole of the magnet 3, thereby using the magnet to move towards the furthermost end of the stator coil.

The same magnetic flux patterns apply, when the machine is acting as a generator or as a motor.

The magnetic field from solenoids 4 and 8 also acts as a form of interpol by overriding the repulsive magnetic field produced at the rear ends of the stator coils 14 and 15.

When acting as a generator, extra current is introduced to the machines output by the magnetic rotor pole applying magnetic field to the inside conductor windings of the stator coils 14 and 15 as the rotor 1 rotates in direction 13.

Figure 6:
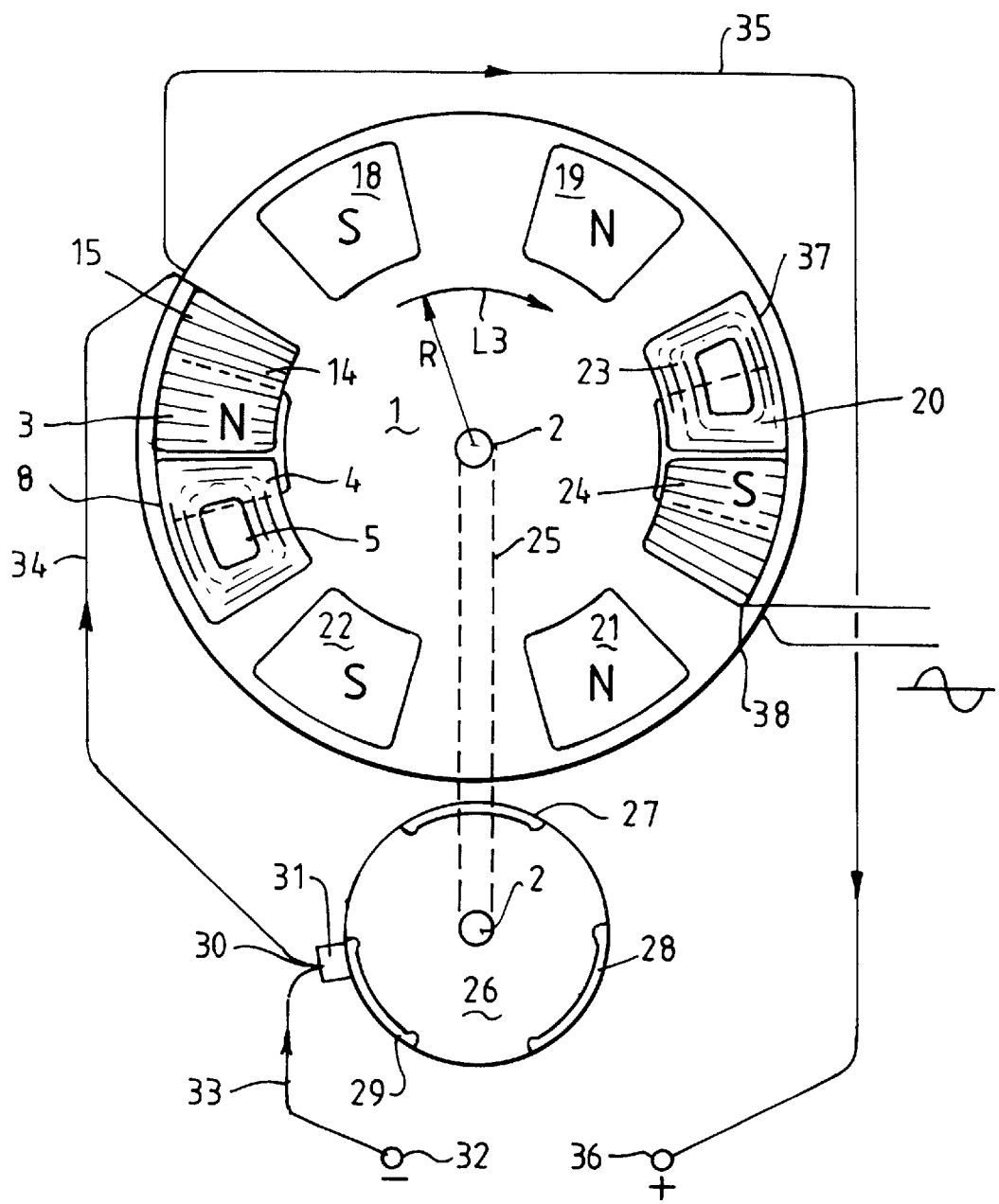
FIG. 6 shows a schematic arrangement of a preferred embodiment of the machine and commutator arrangement.
Figure 7:
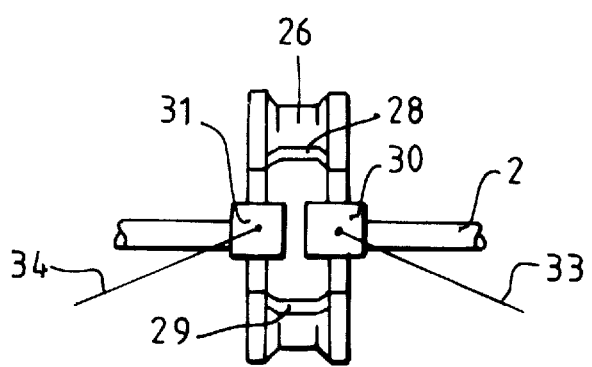
FIG. 7 shows a schematic top view of the commutator of FIG. 6.

Referring to FIG. 6, a schematic front view of the machine is shown with a plurality of rotor magnetic magnets 3, 18, 19, 20, 21 and 22 each with magnetic poles shown as N and S. The stator coil 14 and solenoid 4 are arranged to act as a motor unit. Opposite the stator coil 14 and solenoid 4 are a second set, with solenoids 23 and stator coil 24 act as a generator unit.

A radius of a path of a rotation of the rotor is shown as R. The arrow R extends between the direction arrow 13 and the axis 2 of rotation of the rotor. The solenoids 4 and 23 are arranged so that the axis of each solenoid is transverse the radius of rotation R. Preferably, the axis of the solenoids are parallel with the axis 2.

Axially coupled to the drive shaft 2 by dotted line 25 is a commutator 26. The commutator 26 has electrically conductive segments 27, 28 and 29. Brushes 30 and 31 are applied against the commutator so that an electrical connection is made as the brushes pass over the conducting segments 27, 28 and 29. The remainder of the commutator that the brushes 30 and 31 make contact with is not conductive.

When direct current is applied to the brush 30 via wiring 33 from negative DC terminal 32 and one of the conductor segments 27, 28 or 29 passes underneath aligned brushes 30 and 31, thereby forming an electrical connection, the current continues to flow by conductor 34 to the solenoid 4 and stator coil 14, from there the current returns via wire 35 to positive terminal 36. The solenoid 4 and stator coil 14 produce a magnetic field that causes one of the magnetic rotor poles to be attracted, thus causing the rotor to rotate. When the commutator is rotated by rotation of the rotor and the aligned brushed 30 and 31 contact the non-conducting part of the commutator rotates to a point where the brushes again make contact with another of the conducting segments 27, 28 or 29. The solenoid 4 and stator coil 14 again produce a magnetic field which again causes acceleration of the rotor.

Due to the arrangement of the commutator segments and brushes, direct current is applied when every second magnet is aligned with the solenoid 4. Directional impetus is applied to the rotor 1 by the magnetic attraction generated by the stator coil 14 and solenoid 4 to accelerate the rotor 1 to an operating speed.

The stator coil 23 and solenoid 24 together with corresponding paired solenoid 37 and stator coil 38 (not shown) form a separate alternating current generating unit. The movement of the rotor causes the magnetic poles of the magnets to change with respect to the stator coils 24 and 38 and solenoids 23 and 37. The induces an alternating current as previously described.

The alternating current generated may be increased by increasing the number of conductor windings in the coils of the generator or additional generator unit may be positioned around the perimeter around the machine. It is preferred that the solenoid-stator coil assembly when operated as a motor, is arranged so that the solenoids have more conductor windings than the stator coils.

The rotor, due to the weight of the magnets and the interaction of the solenoids and stator coils, can act as flywheel. The machine when arranged as a motor can operate to boost the flywheel rotation and/or the machine can act as a generator to recover energy from the flywheel.

It should be understood that while only one generator unit and one motor unit are shown in FIG. 6, in practice the number of generator unit and/or motor units will preferably correspond with the number of rotor magnetic poles.

Now that the preferred embodiment has been describe it should be clear to the skilled addressee that the present invention has at least the advantage of the stator and solenoid acting together as a pole and interpol, while at the same time the overlapping of the magnetic field between the solenoid and the rotor magnetic pole does not hinder rotation of the rotor.

Modifications and variations may be made to the invention by a skilled addressee without departing from the basic inventive concept. Such modifications and variations are intended to fall within the scope of the present invention, the scope of which to be determined by the description and appended claims.

The claims defining the present invention are as follows:

1. An electro magnetic rotating machine comprising at least
    a rotor having at least one magnet creating rotor magnetic poles; and
    at least one pair of axially spaced apart solenoids disposed on opposite sides of the rotor magnetic poles, an axis of each solenoid is arranged to be transverse a radius of a path of rotation of one of the magnets of the rotor, wherein the solenoids are configured to minimise overlapping of magnetic flux between at least one of the rotor magnetic poles and one of the solenoids when said magnetic pole is adjacent to said solenoid.

2. An electro magnetic rotating machine according to claim 1, wherein each of the solenoids has substantially the same peripheral shape in cross-section as the magnets, whereby the magnetic flux created by the solenoid and rotor magnetic pole has minimal overlap when they are aligned.

3. An electromagnetic rotating machine according to claim 2, wherein the rotor magnetic pole has substantially the same peripheral pole face as the solenoids.

4. An electro magnetic rotating machine according to claim 1, when the electro magnetic rotating machine operates as a motor, the solenoids are excited by an external power source, thereby creating a magnetic field that causes the rotor magnetic poles to rotate.

5. An electromagnetic rotating machine according to claim 4, wherein the bias means being in the form of at least one pair of axially spaced apart induction coils disposed on opposite sides of the rotor magnetic poles, the axis of each induction coil is arranged to be transverse the axis of rotation of the rotor,
    wherein the solenoids are configured to minimise overlapping of magnetic flux between at least one of the rotor magnetic poles and one of the solenoids when said magnetic pole is adjacent to said solenoid.

6. An electro magnetic rotating machine according to claim 4, wherein the electro magnetic rotating machine includes a commutator axially coupled to the rotor, the commutator is arranged to provide periodic completion of an electric circuit that provides a pulse of direct electric current to the first set of solenoids during completion of the circuit.

7. An electro magnetic rotating machine according to claim 1, when the electro magnetic rotating machine operates as a generator, the rotor is rotated by an external means, thereby creating a dynamic magnetic field that generates electric current in the solenoids.

8. An electro magnetic rotating machine according to claim 7, wherein the dynamic magnetic field generates additional electric current in at least one pair of axially spaced apart induction coils disposed on opposite sides of the rotor magnetic poles, the axis of each induction coil being arranged to be transverse the axis of rotation of the rotor.

9. An electro magnetic rotating machine according to claim 1, wherein the electro magnetic rotating machine operates as a motor and a generator, wherein a first set of solenoids are excited by an electricity generating means, thereby creating a magnetic field that causes the rotor to rotate, and the rotation of the rotor creates a rotating magnetic field that generates an electric current in a second set of solenoids as the rotating magnetic field passes each solenoid, of the second set.

10. An electromagnetic rotating machine according to claim 1, wherein a plurality of rotor magnetic poles are peripherally mounted to the rotor pole and the pair of axially spaced solenoids are serially connected and disposed on opposite sides of the rotor, adjacent to said rotor magnetic poles.

11. An electromagnetic rotating machine according to claim 1, wherein said configuration of rotor magnetic rotor pole solenoids and induction coil bias means is capable of acting as a generator, motor or both.

12. An electro magnetic rotating machine comprising at least
    a rotor having at least one magnet creating rotor magnetic poles;
    at least one pair of axially spaced apart solenoids disposed on opposite sides of the rotor magnetic poles, an axis of each solenoid is arranged to be transverse a radius of a path of rotation of one of the magnets of the rotor; and
    a bias means for providing a directionally biased magnetic field for biasing the rotor to rotate in a predetermined direction.

13. An electromagnetic rotating machine according to claim 12, wherein all solenoids and inductance coils are serially connected.

14. An electromagnetic rotating machine according to claim 1, when acting as a DC motor, further includes a commutator disposed axially rotatory connected to the rotor, the commutator to connect to a first terminal of the solenoids and induction coils, wherein during an on phase of said commutator's rotation, a current source is connected by the commutator to the first terminal, whereby DC electric current energises the solenoids and induction coils, propelling the magnetic rotor pole in a first direction; and wherein during an off phase of the commutator's rotation, the current source is disconnected from the first terminal, whereby no current flows through the solenoids and induction coils.

15. An electro magnetic rotating machine comprising at least
a rotor having at least one magnet creating rotor magnetic poles; and
at least one pair of axially spaced apart solenoids disposed on opposite sides of the rotor magnetic poles, an axis of each solenoid is arranged to be transverse a radius of a path of rotation of one of the magnets of the rotor, each solenoid is serially connected to a corresponding inductance coil,
wherein the solenoids are configured to minimise overlapping of magnetic flux between at least one of the rotor magnetic poles and one of the solenoids when said magnetic pole is adjacent to said solenoid.

16. An electro magnetic rotating machine according to claim 15, wherein each serially connected solenoid and inductance coil are arranged to be adjacent each other so as to create a composite magnetic field.

* * * * *